United States Patent
Orlov et al.

(10) Patent No.: US 9,093,050 B1
(45) Date of Patent: Jul. 28, 2015

(54) DETERMINING WHEN TO DELAY SENDING UPDATES TO A DISPLAY DEVICE

(75) Inventors: Kirill V. Orlov, Cupertino, CA (US); Arnaud M. Froment, San Jose, CA (US); Ezekiel Sanborn de Asis, Santa Clara, CA (US); Maxim Spivak, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 374 days.

(21) Appl. No.: 13/426,099

(22) Filed: Mar. 21, 2012

(51) Int. Cl.
*G09G 5/36* (2006.01)
*G09G 5/393* (2006.01)
*G09G 5/39* (2006.01)

(52) U.S. Cl.
CPC .............. *G09G 5/393* (2013.01); *G09G 5/36* (2013.01); *G09G 5/39* (2013.01)

(58) Field of Classification Search
CPC ....... G09G 3/344; G09G 2310/061–2310/063; G09G 2360/127
See application file for complete search history.

(56) References Cited

U.S. PATENT DOCUMENTS

| 5,047,760 A * | 9/1991 | Trevett et al. ................. 345/558 |
| 2004/0222995 A1* | 11/2004 | Colle ............................. 345/545 |
| 2008/0266244 A1* | 10/2008 | Bai et al. ....................... 345/107 |
| 2008/0309612 A1* | 12/2008 | Gormish et al. .............. 345/105 |
| 2011/0084979 A1* | 4/2011 | Rutman et al. ................ 345/589 |

* cited by examiner

*Primary Examiner* — Charles Tseng
(74) *Attorney, Agent, or Firm* — Lee & Hayes, PLLC

(57) ABSTRACT

Some examples determine when to accumulate updates to a display device. In some implementations, a display manager may determine that a graphical user interface element, such as a user interface window, has opened or closed. The display manager may accumulate updates to a display device for a period of time or until a predetermined number of the updates have been received. After the period of time has elapsed or after the predetermined number of the updates have been received, the display manager may send a single update to the display device. The single update may include or may be equivalent to the one or more updates.

23 Claims, 6 Drawing Sheets

DETERMINING WHEN TO DELAY SENDING UPDATES TO A DISPLAY DEVICE

BACKGROUND

A large and growing population of users enjoy entertainment through the consumption of digital content items (or simply "content items"), such as music, movies, images, electronic books, and so on. The users employ various computing devices to consume such content items. Among these computing devices are electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance the user experience continues to be a priority.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
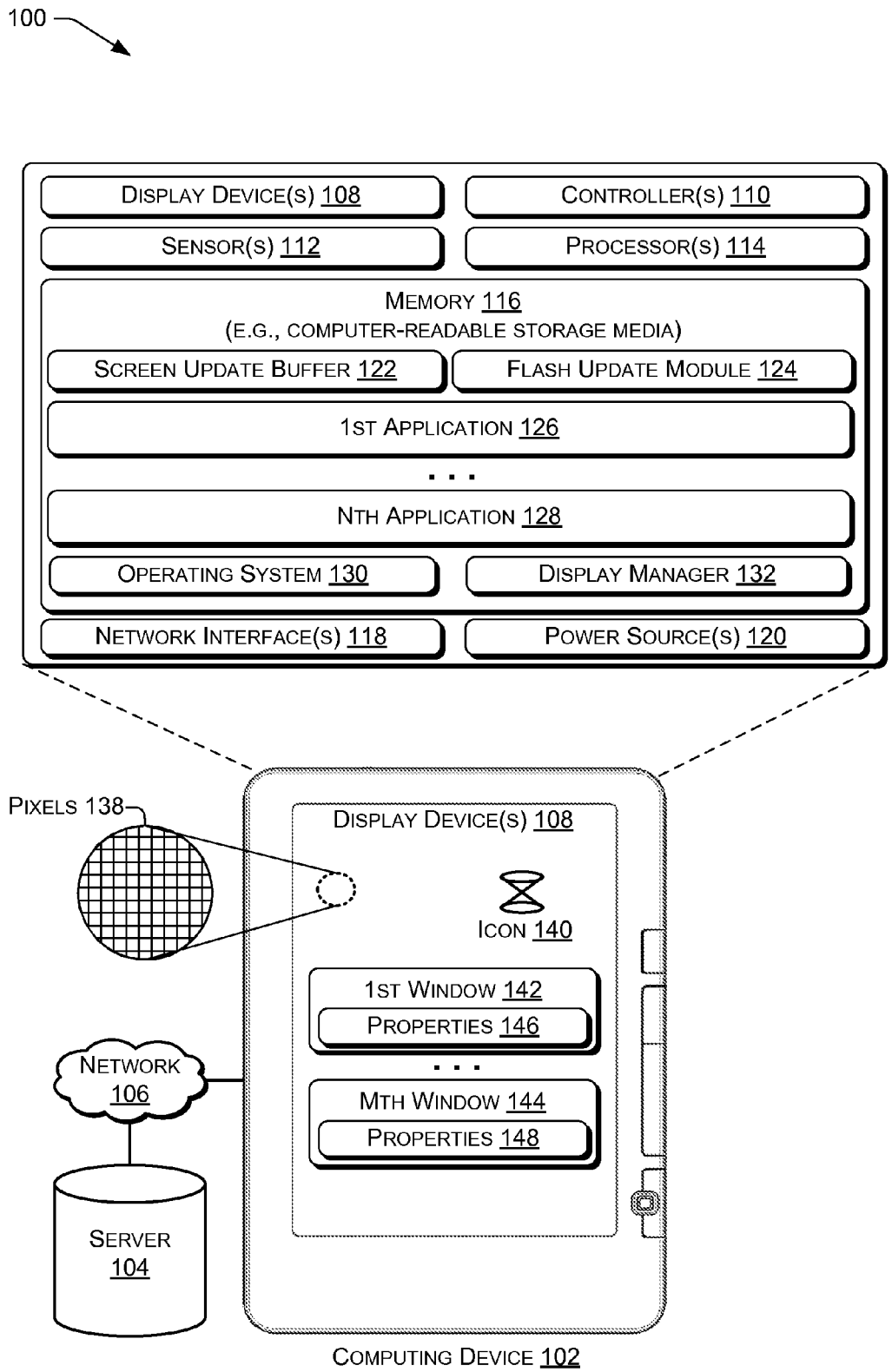
FIG. 1 is an illustrative architecture that includes a computing device capable of determining when to delay sending updates to a display device, according to some implementations.

Computing devices used to consume digital content items may include specialized types of display devices. For example, computing devices used to display electronic books (eBook) may use electronic paper display devices that mimic the characteristics of ink on paper by reflecting light rather than emitting light. Because of these characteristics, electronic paper display devices may update relatively slowly as compared to other types of display devices. The electronic paper display device may display windows of various shapes and sizes. The term window, as used herein, refers to a graphical user interface (GUI) element that is displayed on a display device. Under certain conditions, such as when a window opens or closes, the number of updates that are sent to the electronic paper display device may increase. For example, when a window opens, an application associated with the window may send updates to display the contents of the window on the electronic paper display device. As another example, when a window closes, portions of additional windows that were previously occluded (e.g., by the window that closed) may be updated to display the previously occluded portions of the additional windows. However, sending a large number of updates to the display device may detract from a user's experience of the eBook reader. For example, sending a large number of updates to the display device may cause the user to perceive visual effects, such as ghosting. Also, because the display device may update relatively slowly, sending a large number of updates to the display device may result in a lengthy delay while each individual update is applied to the display device.

Ghosting is a visual effect that may be perceived by someone viewing the display device. To address ghosting, the display device may be periodically flashed (also known as a flash update) to reset the pixels of the display. For example, in some cases, the flash update may turn every pixel of the display device white, then black, then white, to normalize the contrast of the pixels. However, the flash update may take a particular amount of time to perform, during which the user may be unable to view the display or interact with the computing device. In addition, when a large number of updates (e.g., updates accumulated during a period of time) are sent to the display device and more than one update includes an instructions to perform a flash update, the frequent flash updates may be visually unappealing to a user. Thus, when the user is interacting with the computing device, under certain conditions, multiple updates to the display device may be accumulated and sent as a single update to improve the user's experience.

The techniques described herein may determine when to delay sending updates to the display device and may accumulate the updates for a period of time. During the period of time, updates to the display device may be accumulated in a buffer or similar data structure or storage mechanism. After the period of time has elapsed or when a predetermined number of updates have been accumulated, the accumulated multiple updates may be sent to the display device as a single update. In some implementations, a flash update of the display device may be performed after the accumulated multiple updates have been sent to the display device. For example, if one or more of the accumulated multiple updates includes an instruction to perform a flash update, a flash update of the display device may be performed after the accumulated multiple updates have been sent to the display device. Thus, a single flash update instruction that is sent to the display device after the accumulated multiple updates have been sent, may replace one or more flash update instructions in the accumulated multiple updates. As another example, a flash update of the display device may be performed based on a temperature (e.g., an ambient temperature) associated with the display device.

The period of time to delay sending updates to the display device may be determined based on a property of one or more windows displayed on the display device. The property of a window may include a sensitivity setting associated with the window, a draw mode associated with the window, a characteristic of the window, and the like. For example, the characteristic of the window may identify whether the window is a pop-up window, an application window, a page change in a document (e.g., a book or a periodical), a screen saver, a window resulting from a switch from one application to another application, a dialog window, a keyboard window (e.g., that overlays a portion of a touch sensitive screen) to receive input, one or more toolbars (e.g., search bar, favorites bar, and the like), a drop down window that provides matches to input search criteria as a user is providing input, whether the window includes a graphical image, and the like. The sensitivity setting associated with a window may indicate whether the window is more prone to visual effects, such as ghosting, or less prone to visual effects. The draw mode associated with a window may identify a type of content displayed in the window. For example, a first draw mode may be used when a window that displays text, a second draw mode may be used when a window displays graphical images, and a third draw mode may be used when a window displays both mixed content (e.g., both text and graphical images).

A property associated with a window, such as a sensitivity setting, may specify that a flash update is to be performed when the number of changed pixels of the associated window or of the display device satisfies a particular threshold. To illustrate, an eBook reader application may specify that a flash update is to be performed when the number of pixels that have changed values is greater than 600% of the total number of pixels in the associated window or in the display device, resulting in a flash update being performed for every six pages of an eBook that are displayed. A counter or similar data structure may be used to keep track of how many pixels in the window or in the display device have changed in value over time. The counter may be reset after a flash update is performed.

A flash update may be performed based at least partly on a temperature associated with the display device, such as an ambient temperature of the display device, as measured by one or more sensors. The one or more sensors may be located near the display device, such as in a housing of the display device or in a housing of the computing device. Certain types of display devices, such as electronic paper display devices, may have a particular operating temperature range. For example, a display device may have certain characteristics when an ambient temperature of the display device is between X (e.g., 10° Celsius) and Y (e.g., 30° Celsius). When the display device is used in environments where the ambient temperature is below X or above Y, the characteristics of the display devices may change. For example, for some display devices, particular perceived visual effects (e.g., ghosting) may be more noticeable when the ambient temperature is below X or above Y. To reduce ghosting in such situations, the computing device may measure the temperature associated with the display device and perform a flash update based at least partly on the temperature. For example, a flash update may be performed more frequently when the ambient temperature is below X or above Y.

In some cases, some updates may be sent to a portion of the display device while other updates to a remaining portion of the display device are accumulated. To illustrate, the computing device may, under certain circumstances, display one or more icons. For example, when the computing device is performing a lengthy operation (e.g., an operation that takes more than a threshold amount of time to perform), the computing device may display an icon, referred to as a spinner icon, to indicate that the lengthy operation is being performed. To indicate that the operation is in progress, the spinner icon may be displayed at different rotational angles or other types of animation to give the icon the appearance of spinning around. As another example, a battery indicator icon may indicate a power level of a battery and may periodically change value if the power level drops below a particular threshold. As yet another example, a signal strength indicator may indicate a signal strength of a wireless communication between the computing device and a network. As another example, a download indicator may indicate an approximate amount of a file (e.g., a digital content item) that is being downloaded to the computing device from a remote server. Of course, the computing device may use other icons to indicate other related functions provided by the computing device. Some updates may be sent to a portion of the display, such as a particular set of pixels used to display at least some of these icons, while other updates to a remaining portion of the display are accumulated. For example, when icons (e.g., a spinner icon) are displayed, updates to a portion of the display device used to display the icons may continue to be sent while updates to a remainder of the display device are accumulated. Updates to icons, such as the spinner icon, may be sent while other updates are accumulated to indicate to the user that the computing device is still operational. Otherwise, for example, if the pixels of the spinner icon were not updated, a user may erroneously conclude that the computing device was malfunctioning and initiate a reboot or restart to recover. As another example, updates to a progress bar or similar graphic used to indicate a portion of a digital item that has been downloaded (or remains to be downloaded) may be sent while updates to other portions of the screen are accumulated. As yet another example, some updates may be sent to one or more windows (e.g., higher priority windows) while other updates to other windows may not be sent.

The following non-limiting examples illustrate different situations where updates may be delayed for a period of time or when flash updates may be performed. In some situations, when a dialog window pops-up, updates to the dialog window may be delayed for a particular period of time and when the dialog window closes, the entire display device may be updated and a flash update may be performed. If at least one update of multiple accumulated updates requests a flash update, a flash update may be performed after the multiple accumulated updates have been sent to the display device. A sensitivity setting of a topmost (e.g., non-occluded) window may take precedence over sensitivity settings of other (e.g., partially or fully occluded) windows. When a window that was topmost is closed, the sensitivity settings of a next window that is no longer occluded (e.g., the next window is now the topmost) may take precedence over sensitivity settings of other (e.g., partially or fully occluded) windows. Some windows (e.g., a dialog window) may not specify a sensitivity setting or may use a default sensitivity setting. In some cases, windows that display dynamic content may have an associated sensitivity setting. A sensitivity setting of a window may cause a flash update to be performed more frequently (e.g., after every N pages of an eBook are displayed). After M page turns (where M<N), a window may pop-up. After the pop-up window closes, a flash update may be performed. The flash update may reset the sensitivity setting such that a flash update is to be performed after every N pages of an eBook are displayed.

In some cases, applications may dynamically change the sensitivity setting or other characteristic associated with a window. For example, an application may specify a first sensitivity setting for a window displaying a page of an eBook that includes text. After the page that includes the text is turned, a next page that includes an image may be displayed. The application may dynamically change the sensitivity setting of the window to a second sensitivity setting (e.g., an image sensitivity setting), resulting in a flash update being performed after the image is drawn. After the page that includes the image is turned, the application may dynamically change the sensitivity setting of the window back to the first sensitivity setting if the new page that is displayed includes text.

Thus, a determination may be made to delay sending updates to a display device for a period of time. The period of time may be determined based on one or more properties of a window displayed on the display device. Updates to at least a portion of the display device may be accumulated during the period of time. After the period of time has elapsed or after a predetermined number of updates have been accumulated, the accumulated updates may be sent to the display device as a single update. In some implementations, if one or more of the accumulated multiple updates included a flash update, a flash update of the display device may be performed after the accumulated multiple updates have been sent to the display device.

Illustrative Architecture

FIG. 1 is an illustrative architecture 100 that includes a computing device capable of determining when to delay sending updates to a display device, according to some implementations. The architecture 100 includes a computing device 102 coupled to a server 104 via a network 106. The server 104 may include a storefront that enables the acquisition (e.g., purchase, rental, and the like) of digital content items for consumption by the computing device 102. In addition, the server 104 may provide cloud-based services, including storing digital content items that may be consumed by the computing device 102. The network 106 may include one or more networks, such as a wireless local area network (e.g., WiFi®), a wireless wide area network (e.g., a code division multiple access (CDMA) or a global system for mobile (GSM) network), a wired network (e.g., Ethernet), other type of network, or any combination thereof.

The computing device 102 may include a display device 108, one or more controllers 110, one or more sensors 112, one or more processors 114, a memory 116, one or more network interfaces 118, and one or more power sources 120. In some implementations, the display device 108 may include one or more display devices (e.g., display screens).

Electronic paper displays represent an array of display technologies designed to mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display.

In some implementations, the display device 108 may comprise an electronic paper display. The electronic paper display may comprise an electrophoretic display that moves particles between different positions to achieve different color shades. For instance, in a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the particles absorb the incident light and, hence, cause the pixel to appear black to a viewing user. In addition, the particle may situate at varying locations between the front and rear sides of the display to produce varying shades of gray.

Of course, while one example has been given, it is to be appreciated that the electronic paper displays described herein may comprise any other type of electronic paper technology, such as gyricon displays, electrowetting displays, electrofluidic displays, interferometric modulator displays, cholestric liquid crystal displays, and the like. These displays may be capable of rendering grayscale images or, in some instances, may be capable rendering color images.

In some implementations, at least a portion of the display device 108 may be touch-sensitive (e.g., a touchscreen) to enable a user of the computing device 102 to provide input via gestures or other touch-based input. The touchscreen of the display device may enable applications to display a window that includes a keyboard overlay to enable the user to provide input by typing on the keys of the keyboard overlay of the touchscreen. The keyboard overlay may include a QWERTY-based layout, a non-QWERTY-based layout, a numeric keypad, a specialized keypad, or any combination thereof.

The controllers 110 may include a display controller to control the display device 108. For example, the display controller may be capable of instructing the display device 108 to perform a flash update. The sensors 112 may include one or more temperature sensors to determine an ambient (e.g., surrounding) temperature of a portion of the display device 108. The network interfaces 118 may be capable of coupling the computing device 102 to the server 104 via the network 106. For example, the network interfaces 118 may include one or more wireless interfaces, such as a wireless interface compliant with a wireless wide area network standard (e.g., CDMA or GSM) or a wireless local area network standard, such as WiFi®.

The memory 116 may include computer-readable storage media, such as volatile memory, non-volatile memory, removable memory, and/or non-removable memory, implemented in any method or technology for storage of information, such as computer-readable instructions, data structures, program modules, or other data. Also, the processor(s) 114 may include onboard memory in addition to or instead of the memory 116. Examples of storage media that may be included in the memory 116 and/or processor(s) 114 include, but are not limited to, non-transitory media, such as random access memory (RAM), read only memory (ROM), electrically erasable programmable read only memory (EEPROM), flash memory or other memory technology, compact disk (CD-ROM), digital versatile disks (DVD) or other optical storage, magnetic tape, magnetic disk storage or other magnetic storage devices, or any other medium which can be used to store the desired information and which can be accessed by the processor(s) 114. Any such computer-readable storage media may be part of the computing device 102. The memory 116 may include software programs or other executable modules that may be executed by the processor(s) 114.

The memory 116 may include a screen update buffer 122, a flash update module 124, one or more applications, such as a first application 126 up to an $N^{th}$ application 128, an operating system 130, a display manager 132, or any combination thereof. Though not shown in FIG. 1, the memory 116 may include low-level device drivers associated with the computing device 102, other software or firmware, or any combination thereof.

A temperature sensor of the sensors 112 may be capable of determining a temperature associated with the display device 108. The flash update module 128 may determine when to perform a flash update of the display device 108 based on the temperature.

The operating system 130 and the N applications 126 to 128 may send updates to be displayed on the display device 108. Each of the updates may be temporarily stored (e.g., buffered) in the screen update buffer 122 before being sent to the display device 108. Based on contents of the screen update buffer 122, the display manager 132 may determine when to send updates from the screen update buffer 122 to the display device 108. For example, the display manager 132 may periodically (e.g., at a predetermined interval) send the contents of the screen update buffer 122 to the display device. Under some conditions, the display manager 132 may delay (e.g., pause) sending updates to the display device 108 for a period of time, resulting in multiple updates accumulating in the screen update buffer 122. After the period of time has elapsed or after a predetermined number of updates have been accumulated, the display manager 132 may send the updates accumulated in the screen update buffer 122 as a single update to the display device 108. After sending a single update that includes the accumulated updates, the display manager 132 may resume periodically sending updates from the screen update buffer 122 to the display device 108. In some cases, the single update that is sent after accumulating the updates may be functionally equivalent to the accumulated updates, e.g., the single update may change the values of the pixels in the display device 108 to the final values that would have resulted from applying each of the accumulated updates individually to the pixels of the display device. For example, the screen update buffer 122 may be implemented as a matrix or similar data structure in which each entry in the matrix corresponds to a value of a pixel in the display device 108. To illustrate, the matrix may have H×W entries, where H is the height, in pixels, and W is the width, in pixels, of the display device 108. When updates are accumulated in the screen update buffer 122, each update may change a value of an entry in the matrix that corresponds to the pixels that are affected by the update. To send a single update that includes the accumulated updates, the display manager 132 may send or copy the contents of the screen update buffer 122 to the display device 108. In this way, the single update may change the values of the pixels of the display device 108 to the values that the pixels would have had the accumulated updates been applied individually to the display device 108.

The display device 108 may include a display screen comprised of multiple pixels 138. In some cases, the display device 108 may display one or more icons, such as an icon 140. The icon 140 may be a spinner icon that is used to indicate when the computing device 102 is performing a lengthy operation, a signal strength icon used to indicate a signal strength of wireless network connection, a power level icon used to indicate a power level of one or more of the power sources 120, or another icon used to graphically display a characteristic (e.g., volume level, download progress, and the like) associated with the computing device 102. In some implementations, the display manager 132 may continue to send updates to a portion of the display device 108 (e.g., a subset of the pixels 138), while delaying sending updates to the remaining portion of the display device 108. For example, the portion of the display device 108 to which updates are sent may include one or more icons (e.g., the icon 140).

In operation, at least some of the N applications 126 to 128 may display one or more associated windows on the display device 108. For example, some of the N applications 126 to 128 may display a first window 142 up to and including an $M^{th}$ window 144 (where M>1). Each of the M windows 142 to 144 may have one or more associated properties. For example, the first window 142 may have one or more properties 146 and the $M^{th}$ window 144 may have one or more properties 148.

The display manager 132 may delay (e.g., pause) sending updates to the display device 108 based on various conditions, such as when a graphic user interface element (e.g., a window) opens or closes. For example, the first application 126 may open and display content in the first window 142. A user of the computing device 102 may launch an $N^{th}$ application 128. In response, the $N^{th}$ application 128 may open the $M^{th}$ window 144. The display manager 132 may determine that the $M^{th}$ window 144 has opened. The display manager 132 may determine a period of time to delay sending updates to the display device 108 based at least partially on one or more of the properties 148 of the $M^{th}$ window 144, the properties of the first window 142, or both.

In some cases, the $N^{th}$ application 128 may open more than one window on the display device 108. For example, if the $N^{th}$ application 128 is a search application, the $N^{th}$ application 128 may open a first window to enable the user to provide search input and open a second window in which to display search results. To illustrate, the search input window may display a keyboard overlay for a touch sensitive portion of the display device 108 to enable the user to provide search input. In such cases, where an application opens more than one window on the display device 108, the display manager 132 may determine a period of time to delay (e.g., suspend) sending updates to the display device 108 based at least partly on the properties of each of the windows opened by the application. For example, the display manager 132 may determine the period of time based on properties of one or more topmost (e.g. non-occluded) windows. To illustrate, if an application opens a first window to receive user input for a search and opens a second window to display search results, both windows may be non-occluded windows. In this situation, the display manager 132 may determine the period of time based at least partly on properties of both windows.

After the display manager 132 has determined a period of time or a number of updates to accumulate, the display manager 132 may delay sending updates to at least a portion of the display device 108. The display manager 132 may accumulate updates for the display device 108 in the screen update buffer 122 until the period of time has elapsed or until a predetermined number of updates have been accumulated. For example, the accumulated updates may include updates associated with any recently (e.g. within a predetermined period of time such as one second) opened or closed graphical user interface elements (e.g., windows). After accumulating the updates in the screen update buffer 122, the display manager 132 may send a single update to the display device 108 that includes or is equivalent to the accumulated updates.

In some implementations, while pausing sending the updates to a portion of the display device 108 for the period of time, the display manager 132 may continue to send updates to a remaining portion of the display device 108. For example, the display manager 132 may continue to send updates to the portion of the display device 108 that is used to display one or more icons, such as the icon 140, or to specified windows, such as the $M^{th}$ window 144.

After the period of time has elapsed or after a predetermined number of updates have been accumulated, the display manager 130 may resume sending updates to the display device 108 after sending a single update that includes or is equivalent to the accumulated updates. In some cases, the display manager 132 may instruct the update module 124 to perform a flash update of the display device 108 based on one or more of the accumulated updates, an ambient temperature of the display device 108, the properties (e.g., the properties 146 to 148) of one or more windows, or any combination thereof. For example, if at least one of the updates accumulated over the period of time includes an instruction to perform a flash update, the display manager 132 may cause a flash update of the display device 108 after the accumulated updates have been sent for display device 108. As another example, the display manager 132 may cause a flash update of the display device 108 based on a temperature associated with the display device 108 (e.g., if the temperature is below a first temperature threshold or above a temperature threshold), a property associated with the opened window(s), a number of pixels changed by the accumulated updates, or any combination thereof.

At a later point in time, one or more of the windows that opened may be closed. For example, the user of the computing device 102 may close the application that opened the windows, an application may automatically (e.g., without human interaction) close a window that the application had opened, or the user may manually close one or more of the open windows. To illustrate, the user of the computing device 102 may close a search application, resulting in the search application closing the windows (e.g., user input window and search results window) that the search application had previously opened. As another illustration, the user of the computing device 102 may close an eBook reader application, resulting in a window that was displaying contents of the eBook to be closed.

When a window displayed on the display device 108 closes, the display manager 132 may determine a period of time to delay (e.g., pause) sending updates to the display device 108. For example, the display manager 132 may delay sending updates to additional windows that were previously occluded by the window and that were revealed when the window closed. The display manager 132 may determine the period of time based on properties of each of the topmost (e.g., non-occluded) additional windows that are revealed (e.g., displayed) after the window closes. For example, when the $M^{th}$ window 144 opens, the $M^{th}$ window 144 may at least partially occlude the first window 142. When the $M^{th}$ window 144 closes, the first window 142 may become the topmost window displayed on the display device 108 because the first window 142 is no longer occluded by the $M^{th}$ window 144. If the window that closed did not occlude any additional windows, the display manager 132 may delay sending updates to the display device to accumulate updates to a view that the display device 108 displays when there are no open windows. For example, when no windows are displayed, the display device 108 may display one or more icons (e.g., the icon 140), a desktop environment view, a background image, or any combination thereof. The display manager 132 may determine a period of time to delay sending updates to the display device 108. In some cases, the period of time may be modified based on one or more properties of the topmost (e.g., non-occluded) window, the window that closed, another characteristic (e.g., background image) associated with the display device 108, or any combination thereof.

The display manager 132 may delay sending updates to at least a portion of the display device 108 during the period of time or until a predetermined number of updates have been accumulated. For example, the display manager 132 may accumulate updates for the display device 108 in the screen update buffer 122 (or similar data structure). In some implementations, while pausing sending the updates to a portion of the display device 108 for the period of time, the display manager 132 may continue to send updates to a remaining portion of the display device 108. For example, the display manager 132 may continue to send updates to the portion of the display device 108 that is used to display specific windows or one or more icons.

After the period of time has elapsed or after a predetermined number of updates have been accumulated, the display manager 130 may send the accumulated updates (e.g., accumulated in the screen update buffer 122) as a single updated to the display device 108 and resume periodically sending updates to the display device 108. In some cases, the display manager 132 may instruct the update module 124 to perform a flash update of the display device 108. For example, if at least one of the updates accumulated over the period of time includes an instruction to perform a flash update, the display manager 132 may cause a flash update of the display device 108 after the accumulated updates have been sent for display device 108. As another example, the display manager 132 may cause a flash update based on a temperature of the display device 108 (e.g., when the temperature is below a first temperature threshold or above a second temperature threshold), one or more properties associated with the closed window(s), a number of pixels changed by the accumulated updates, or any combination thereof. In some cases, a weighted formula that assigns weights to each of the temperature of the display device 108, the properties associated with the closed window(s), and the number of pixels changed by the accumulated updates may be used to determine when to perform a flash update.

Thus, the display manager 132 may send updates to the display device at predetermined intervals and determine when to pause (e.g., delay) sending the updates to the display device 108. For example, the display manager 132 may delay sending updates the display device 108 after determining that a window has opened or after determining that a window has closed. The display manager 132 may determine a time period to accumulate updates and/or how many update to accumulate based on one or more factors, such as properties of recently opened windows, properties of recently closed windows, characteristics of the display device, or any combination. By accumulating multiple updates when a situation is detected in which multiple updates may be sent to the display device 108 in a relatively short period of time, a single update of the display device may be performed using the accumulated multiple updates, resulting in a smoother user experience. For example, a faster update of the display device may be performed as compared to not pausing sending the multiple updates. As another example, fewer flash updates of the display device may be performed as compared to not pausing the multiple updates, because a single flash update may be performed (e.g., after sending the accumulated multiple updates) rather than multiple flash updates. As yet another example, a user of the computing device 102 may experience (e.g., perceive) fewer visual effects, such as ghosting, on the display device 108.

Figure 2:
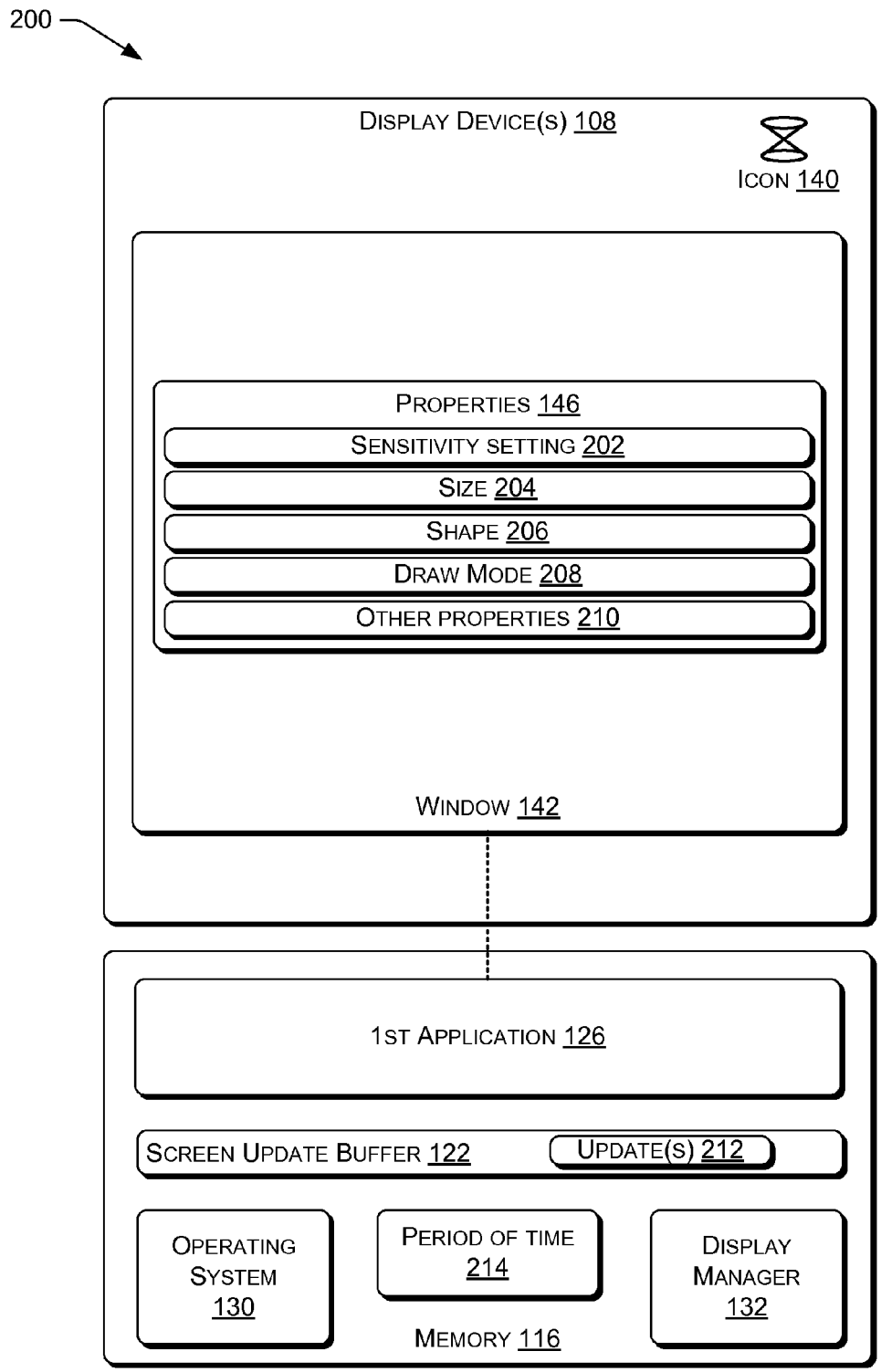
FIG. 2 is an illustrative architecture that includes a display manager to determine when to delay sending updates to a display device based on a property of a window, according to some implementations.

FIG. 2 is an illustrative architecture 200 that includes a display manager to determine when to delay sending updates to a display device based on a property of a window, according to some implementations. The architecture 200 includes the display device 108 used to display the window 142 and one or more icons, such as the icon 140. The window 142 may have one or more associated properties 146. For example, the properties 146 may include a sensitivity setting 202, a size 204, a shape 206, a draw mode 208, other properties 210 or any combination thereof. The sensitivity setting 202 may indicate whether the contents of the window 142 are more prone to visual effects, such as ghosting, or less prone to visual effects. The size 204 may identify a number of pixels displayed by the window 142, a length and width of the window 142 in pixels, or other size-related attribute of the display device 108. The shape 206 may identify a shape associated with the window 142. For example, the shape 206 may indicate that the window 142 has a geometric shape, such as a square, a rectangle, a triangle, a circle, a rhombus, a trapezoid, and the like. The draw mode 208 may identify a type of content displayed in the window 142. For example, a first draw mode may be used when the window 142 displays text, a second draw mode may be used when the window 142 displays graphical images, and a third draw mode may be used when the window 142 displays both mixed content (e.g., both text and graphical images).

The window 142 may be created by and associated with the first application 126. In some cases, an application (e.g., the first application 126) may dynamically modify one or more properties (e.g., the properties 146). For example, the first application 126 may modify the size 204, the shape 206, the draw mode characteristics, other properties 210, or any combination thereof.

The screen update buffer 122 may be used to store updates to the display device 108. For example, the display manager 132 may periodically (e.g., at predetermined intervals) send the updates from the screen update buffer 122 to the display device 108. Under some situations, such as when a graphical user interface element appears or is removed (e.g., a window is opened or closed), the display manager 132 may delay (e.g., pause) sending the updates 212 to the display device and accumulate updates 212 in the screen update buffer 122. For example, when the window 142 is opened (e.g., by the first application 126), the display manager 132 may determine a period of time 214 to delay sending the updates 212 to the display device 108. In some cases, the period of time 214 may be modified based on one more of the properties 146 of the window 142. For example, the display manager 132 may modify the period of time 214 based on the sensitivity setting 202, the size 204, the shape 206, the draw mode 208, other properties 210 or any combination thereof, To illustrate, the period of time 214 to delay sending updates may be increased when the size 204 of the window 142 is greater than a threshold size. As another illustration, the period of time 214 to delay sending updates may be increased when the draw mode 208 indicates that the window 142 is displaying a graphic or an image rather than text.

During the period of time 214, the updates 212 may be accumulated in the screen update buffer 122. After the period of item 214 has elapsed or after a predetermined number of updates have been accumulated, the display manager 132 may send a single update that includes or is equivalent to the accumulated updates 212 to the display device 108.

In some cases, the display manager 132 may cause a flash update of the display device 108 based on the accumulated updates 212, one or more of the properties 146, a temperature associated with the display device 108, or any combination thereof. For example, a flash update may be performed when at least one of the accumulated updates 212 includes an instruction to perform a flash update. As another example, a flash update may be performed when the draw mode 208 indicates that a graphic or an image is being displayed in the window 142.

At a later point in time, the window 142 may be closed. For example, the user of the computing device 102 may manually close the first application 126 that opened the window 142, the user may manually close one or more of the open windows, or the first application 126 may automatically (e.g., without human interaction) close the window 142.

When the window 142 displayed on the display device 108 closes, the display manager 132 may determine the period of time 214 to delay (e.g., pause) sending updates to the display device 108 or determine or determine how many updates are to be accumulated. The display manager 132 may determine the period of time based on the properties 146, a characteristic of the display device 108, or both. For example, when no windows are being displayed, the display device 108 may display one or more icons (e.g., the icon 140), a desktop environment view, a background image, or any combination thereof. The display manager 132 may determine the period of time to delay sending updates to the display device 108.

The display manager 132 may modify the period of time based on the displayed icons, the desktop environment view, the background image, another characteristic of the display device 108, or any combination thereof.

The display manager 132 may delay sending the updates 212 to at least a portion of the display device 108. For example, the display manager 132 may accumulate the updates 212 for the display device 108 in the screen update buffer 122 until the period of time has elapsed or until a predetermined number of updates have been accumulated. In some implementations, while pausing sending the updates to a portion of the display device 108, the display manager 132 may continue to send some of the updates 212 to a remaining portion of the display device 108. For example, the display manager 132 may continue to send some of the updates 212 to the portion of the display device 108 that is used to display specific windows or one or more icons.

After the period of time 214 has elapsed or after a predetermined number of updates have been accumulated, the display manager 130 may send the accumulated updates 212 as a single update to the display device 108. In some cases, the display manager 132 may instruct the update module 124 to perform a flash update of the display device 108. For example, if at least one of the updates accumulated over the period of time includes an instruction to perform a flash update, the display manager 132 may cause a flash update of the display device 108 after the accumulated updates have been sent for display device 108. As another example, the display manager 132 may cause a flash update based on a temperature of the display device 108 (e.g., when the temperature is below a first temperature threshold or above a second temperature threshold), one or more of the properties 146, a number of pixels changed by the accumulated updates 212, or any combination thereof.

Thus, when a user interface element, such as the window 142, is opened or closed, the display manager 132 may delay sending the updates 212 to the display device 108. After a period of time has elapsed or after a predetermined number of updates have been accumulated, the display manager 132 may send a single update that includes the accumulated updates 212 to the display device 108. By sending a single update that includes the accumulated updates 212, a user viewing the display device 108 may perceive fewer visual effects, such as ghosting, resulting in a smoother user experience.

Figure 3:
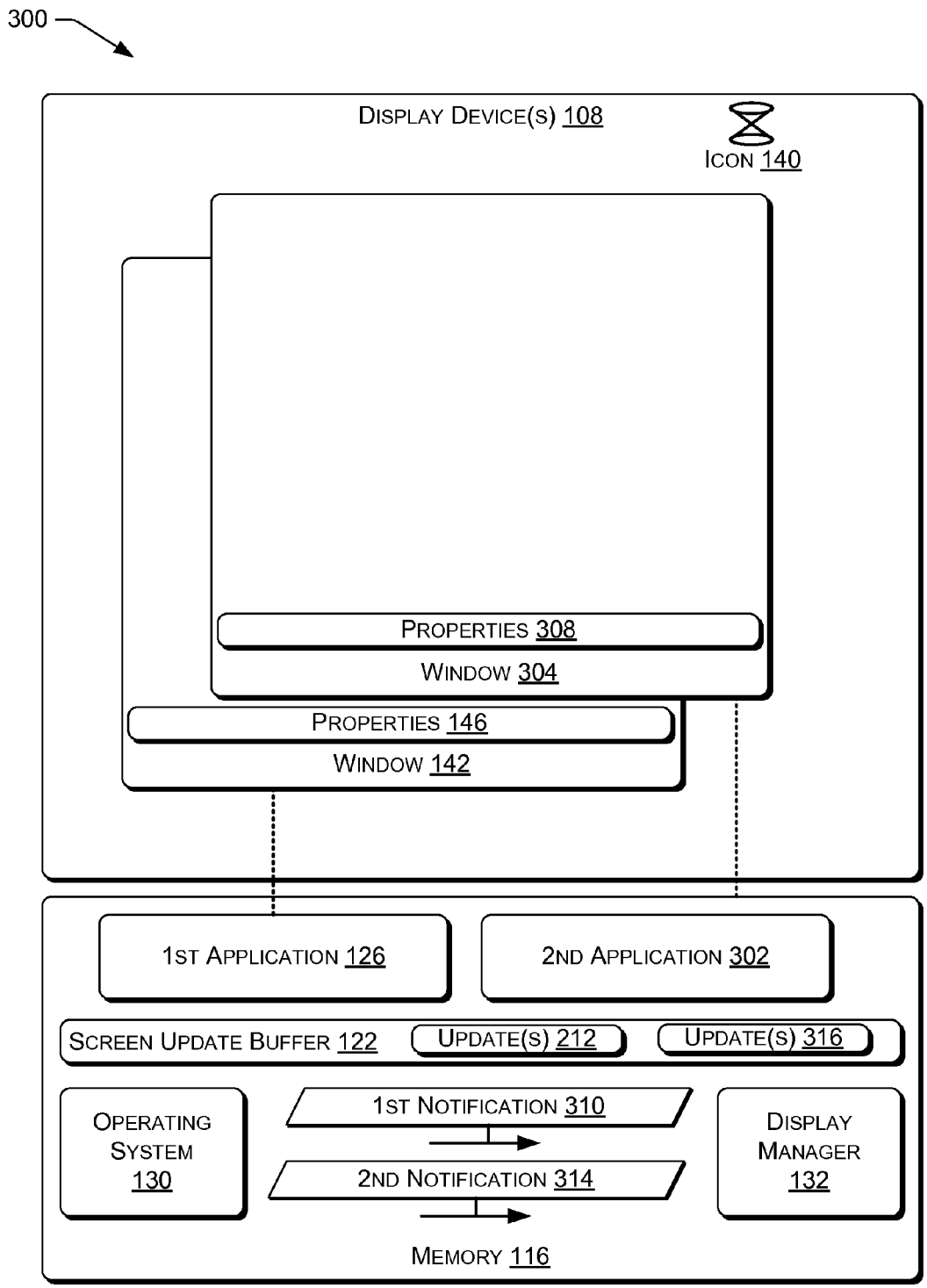
FIG. 3 is an illustrative architecture that includes a display manager to determine when to delay sending updates to a display device in response to determining that a window has opened, according to some implementations.

FIG. 3 is an illustrative architecture 300 that includes a display manager to determine when to delay sending updates to a display device in response to determining that a window has opened or closed, according to some implementations. In FIG. 3, the second application 302 may open a window 304 on the display device 108. For example, the second application 302 may open the window 304 when a user opens or switches to the second application 302. The window 304 may at least partially occlude the window 142. The window 304 may have one or more properties 308.

The display manager 132 may determine that a graphical user interface element, such as the window 304, has opened on the display device 108. For example, the operating system 130 may send a first notification 310 to the display manager 132 to indicate that the window 304 has opened. In some implementations, the first notification 310 may indicate that the window 304 overlaps (e.g., partially occludes) the window 142. In other implementations, the display manager 132 may determine that the window 304 partially occludes the window 142 after receiving the first notification 310 indicating that the window 304 has opened.

In response to determining that the window 304 has opened, the display manager 132 may determine a time period to delay sending updates 212 to the display device 108. The time period to delay sending updates may be modified based on one or more of the properties 308, the properties 146, or both. During the determined time period, the display manager 132 may accumulate the updates 212 in the screen update buffer 122. For example, the updates 212 may include updates sent by the second application 302 for display within the window 304.

The display manager 132 may delay (e.g., suspend) sending the updates 212 to at least a portion of the display device 108. For example, the display manager 132 may accumulate the updates 212 in the screen update buffer 122 (or similar data structure) until the period of time has elapsed or until a predetermined number of updates have been accumulated. In some implementations, while pausing sending some of the updates 212 for the period of time, the display manager 132 may continue to send other updates, such as updates to select windows or to one or more icons, such as the icon 140.

After the period of time has elapsed or after a predetermined number of updates have been accumulated, the display manager 130 may send a single update that includes the accumulated updates 212 to the display device 108. In some cases, the display manager 132 may instruct the flash update module 124 to perform a flash update of the display device 108 based on the accumulated updates 212, the properties 146, the properties 308, a temperature associated with the display device 108, or any combination thereof. For example, if at least one of the updates 212 includes an instruction to perform a flash update, the display manager 132 may cause a flash update of the display device 108 after the accumulated updates 212 have been sent for display device 108. As another example, the display manager 132 may cause a flash update of the display device 108 when the properties 308 indicate that the window 304 has a size greater than a threshold size. As yet another example, the display manager 132 may cause a flash update of the display device 108 when the properties 308 indicate that the window 304 is displaying a graphic illustration or an image (e.g., photograph).

At a later point in time, the display manager 132 may determine that the window 304 has closed (e.g., resulting in an architecture similar to the architecture 200 of FIG. 2). For example, the user of the computing device 102 may close the second application 302 that opened the window 304 or the user may manually close the window 304. In some cases, the display manager 132 may determine that the window 304 has closed. In other cases, the display manager 132 may receive a second notification 314 from the operating system 130 indicating that the window 304 has closed.

In response to determining that the second window has closed, the display manager 132 may determine whether any windows that were at least partially occluded by the window 304 have been revealed (e.g., no longer occluded). When the display manager 132 determines that one or more windows are no longer occluded (e.g., the window 142), the display manager 132 may determine a period of time to delay sending updates to the display device 108. The display manager 132 may modify the period of time to delay sending updates to the display device 108 based on the properties 146 of the window 142, the properties 308 of the window 304, a characteristic of the display device 108, or any combination thereof.

The display manager 132 may delay sending updates to at least a portion of the display device 108 during the period of time. For example, the display manager 132 may accumulate additional updates 316 in the screen update buffer 122 (or similar data structure) until the period of time has elapsed or until a predetermined number of updates have been accumulated.

In some implementations, while delaying sending some of the additional updates 316 for the second period of time, the display manager 132 may continue to send selected updates to another portion of the display device 108. For example, the display manager 132 may continue to send selected updates to the portion of the display device 108 that is used to display a window or an icon.

After the period of time has elapsed or after a predetermined number of updates have been accumulated, the display manager 130 may send a single update that includes the accumulated additional updates 316 to the display device 108. In some cases, the display manager 132 may instruct the update module 124 of FIG. 1 to perform a flash update of the display device 108 based on the accumulated additional updates 316, the properties 146, the properties 308, a temperature associated with the display device 108, or any combination thereof. For example, if at least one of the accumulated additional updates 316 includes an instruction to perform a flash update, the display manager 132 may cause a flash update of the display device 108 after the accumulated additional updates 316 have been sent to the display device 108.

Thus, when a user interface element, such as the window 304, is opened or closed, the display manager 132 may determine a period of time to delay sending the updates 212 to the display device 108. After the period of time has elapsed or after a predetermined number of updates have been accumulated, the display manager 132 may send a single update that includes the accumulated updates 212 to the display device 108. By sending a single update that includes the accumulated updates 212, a user viewing the display device 108 may perceive fewer visual effects, such as ghosting, resulting in a smoother user experience.

Figure 4:
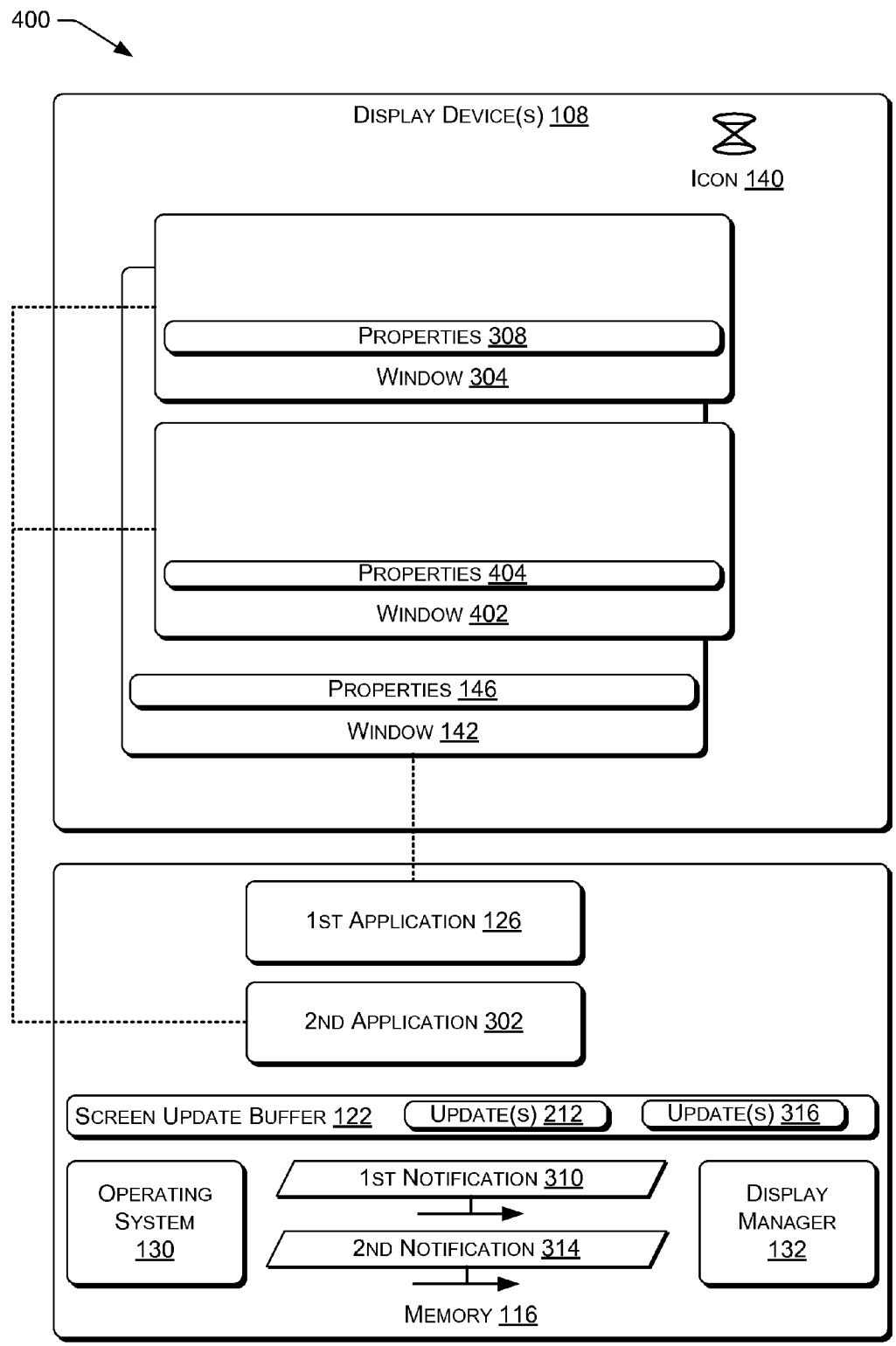
FIG. 4 is an illustrative architecture that includes a display manager to determine when to delay sending updates to a display device in response to determining that more than one window has opened, according to some implementations.

FIG. 4 is an illustrative architecture that includes a display manager to determine when to delay sending updates to a display device in response to determining that more than one window has opened, according to some implementations. In FIG. 4, the second application 302 may open more than one window, such as the window 304 and a window 402, on the display device 108. For example, the second application 302 may open the window 304 and the window 402 when a user opens or switches to the second application 302. To illustrate, the window 402 may be used to receive and/or display user input (e.g., search input) while the window 304 may display results (e.g., search results) based on the user input. For example, the window 402 may include a keyboard overlay of a touch sensitive portion of the display device 108 and an input display area that displays the results of the user typing on the keyboard overlay. While the second application 302 is illustrated as opening two windows in FIG. 4, in some cases, the second application 302 may open more than two windows. The window 304, the window 402, or both may at least partially occlude the window 142. The window 304 may have the properties 308 and the window 402 may have one or more properties 404.

The display manager 132 may determine that more than graphic user interface element, such as the windows 304 and 402, have opened on the display device 108. For example, the operating system 130 may send a first notification 310 to the display manager 132 to indicate that the windows 304 and 402 have opened. In some implementations, the first notification 310 may indicate that one or both of the windows 304 or 402 at least partially occlude the window 142. In other implementations, the display manager 132 may determine that one or both of the windows 304 or 402 at least partially occlude the window 142 after receiving the first notification 310 indicating that the window 304 has opened.

In response to determining that at least one of the window 304 or the window 402 has opened, the display manager 132 may determine a time period to delay sending updates to the display device 108. During the determined time period, the display manager 132 may accumulate updates 212 in the screen update buffer 122. For example, the updates 212 may include updates sent by the second application 302 for display in at least one of the window 304 or the window 402. The display manager 132 may modify the determined time period based on the properties 308, the properties 404, the properties 146, a characteristic of the display device 108, or any combination thereof.

After the display manager 132 has determined the period of time, the display manager 132 may delay sending some of the updates 212 to the display device 108 during the determined period of time. For example, the display manager 132 may accumulate the updates 212 in the screen update buffer 122 (or similar data structure) until the period of time has elapsed or until a predetermined number of updates have been accumulated. In some implementations, while pausing sending some of the updates 212 for the period of time, the display manager 132 may continue to send other updates, such as updates to a portion of the display device 108 that is used to display a particular window or a particular icon (e.g., the icon 140).

After the period of time has elapsed or after a predetermined number of updates have been accumulated, the display manager 130 may send a single update that includes the accumulated updates 212 to the display device 108. In some cases, the display manager 132 may instruct the flash update module 124 to perform a flash update of the display device 108 based on the accumulated updates 212, the properties 146, the properties 308, the properties 404, a temperature associated with the display device 108, or any combination thereof. For example, if at least one of the updates 212 includes an instruction to perform a flash update, the display manager 132 may cause a flash update of the display device 108 to be performed after sending the accumulated updates 212 to the display device 108.

At a later point in time, the display manager 132 may determine that at least one of the window 304 or the window 402 has closed. For example, a user may close the second application 302. As another example, the user may manually close at least one of the window 304 or the window 402. In some cases, the display manager 132 may receive the second notification 314 from the operating system 130 indicating that at least one of the window 304 or the window 402 has closed.

In response to determining that at least one of the window 304 or the window 402 has closed, the display manager 132 may determine whether any windows that were at least partially occluded by at least one of the window 304 or the window 402 have been revealed (e.g., no longer occluded). When the display manager 132 determines that one or more windows are no longer occluded (e.g., the window 142), the display manager 132 may determine a period of time to delay sending updates to the display device 108. During the period of time, updates to the portion of the window(s) that were previously occluded may be accumulated. The display manager 132 may modify the period of time to delay sending updates to the display device 108 based on the properties 146, the properties 308, the properties 404, a characteristic of the display device 108, or any combination thereof.

After the display manager 132 has determined the period of time, the display manager 132 may delay sending updates to at least a portion of the display device 108 during the period of time. For example, the display manager 132 may accumulate additional updates 316 in the screen update buffer 122 (or similar data structure) until the period of time has elapsed or until a predetermined number of updates have been accumulated.

In some implementations, while delaying sending some of the additional updates 316 for the period of time, the display manager 132 may continue to send some updates to a portion of the display device 108. For example, the display manager 132 may continue to send some of the updates 316 to a portion of the display device 108 that is used to display specific windows or one or more icons.

After the period of time has elapsed or after a predetermined number of updates have been accumulated, the display manager 130 may send a single update that includes the accumulated additional updates 316 to the display device 108. In some cases, the display manager 132 may instruct the update module 124 of FIG. 1 to perform a flash update of the display device 108 based on the accumulated additional updates 316, the properties 146, the properties 308, the properties 404, a characteristic (e.g., temperature) associated with the display device 108, or any combination thereof. For example, if at least one of the accumulated additional updates 316 includes an instruction to perform a flash update, the display manager 132 may cause a flash update of the display device 108 after the accumulated additional updates 316 have been sent for display device 108.

Thus, when one or more user interface elements, such as the windows 142, 304, or 404, are opened or closed, the display manager 132 may determine a period of time to delay sending the updates 212 to the display device 108. After the period of time has elapsed or after a predetermined number of updates have been accumulated, the display manager 132 may send a single update that includes the accumulated updates 212 or 316 to the display device 108. By sending a single update that includes the accumulated updates 212, a user viewing the display device 108 may perceive fewer visual effects, such as ghosting, resulting in a smoother user experience.

Various processes, instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processor(s) 114, as hardware, and/or as firmware. Typically, the functionality of the program modules may be combined or distributed as desired in various embodiments. An implementation of these modules and techniques may be stored on or transmitted across some form of computer-readable media.

The modules stored in the memory 116 may be implemented across one or more servers in a cloud computing environment, on a local device, or on a combination of both. The following discussion does not limit the implementation of the modules stored in the memory 116 to any particular device or environment.

Furthermore, while FIGS. 1-4 set forth examples of suitable architectures to determine when to delay sending updates to a display device, numerous other possible architectures, frameworks, systems and environments will be apparent to those of skill in the art in view of the disclosure herein. Additionally, while the examples herein have been described in the environment of a grayscale display device, other implementations may be directed to other types of display devices, such as color display devices, three-dimensional (3D) display devices, and the like.

Example Processes In the flow diagrams of FIGS. 5 and 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500 and 600 are described with reference to the architectures 100, 200, 300, or 400 as described above, although other models, frameworks, systems and environments may implement these processes.

Figure 5:
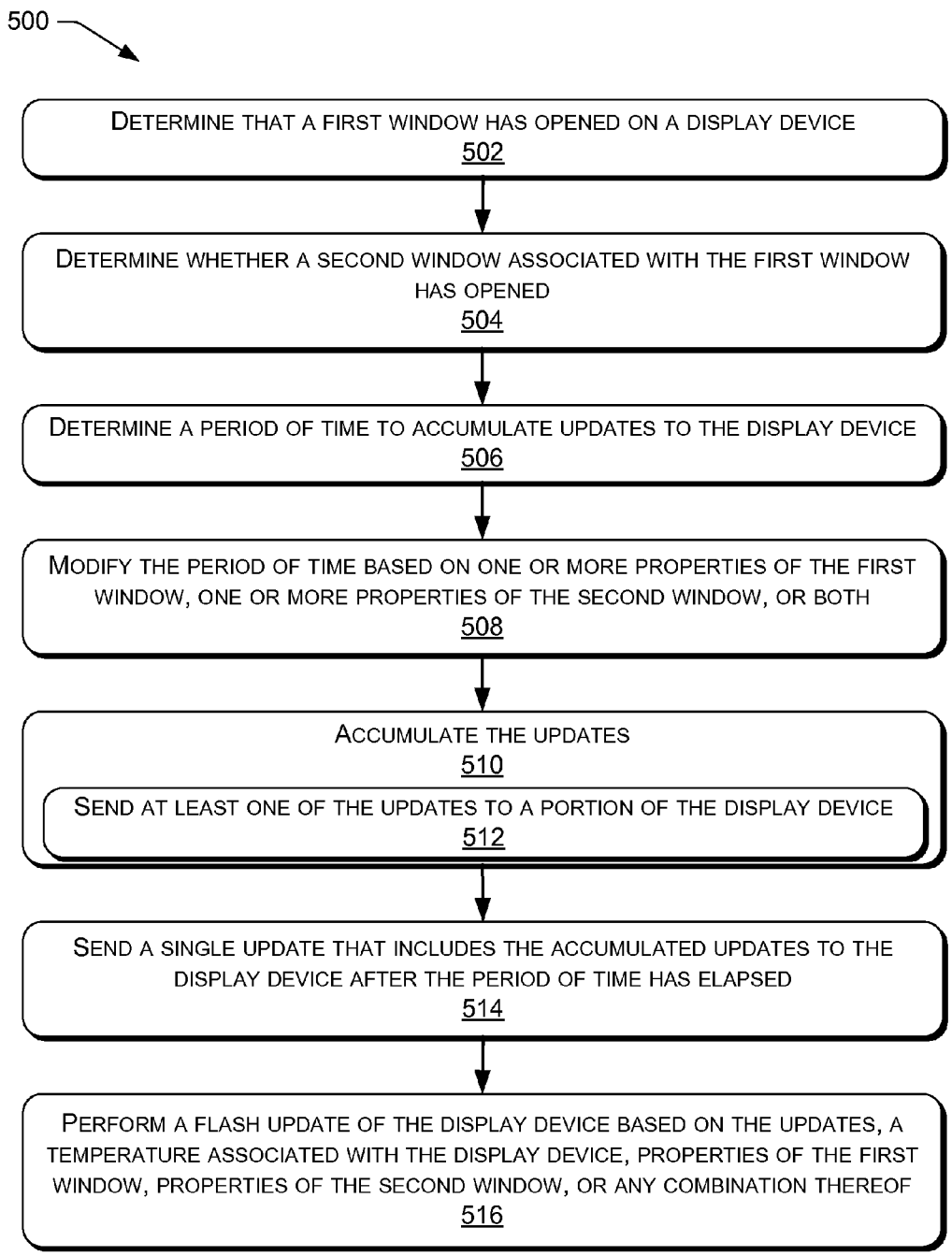
FIG. 5 is a flow diagram of an example process that includes determining a period of time to accumulate updates to a display device when a window has opened, according to some implementations.

FIG. 5 is a flow diagram of an example process 500 that includes determining a period of time to accumulate updates to a display device when a window has opened, according to some implementations. The process 500 may be performed by a software or firmware module of the display device 108 of FIG. 1, such as the display manager 132.

At 502, a determination is made that a first window (or other graphical user interface element) has opened on a display device. For example, in FIG. 2, the display manager 132 may determine that the window 142 has opened.

At 504, a determination is made whether a second window is associated with the first window. For example, in FIG. 4, the display manager 132 may determine that the window 402 is associated with the window 304.

At 506, a period of time to accumulate updates is determined. For example, in FIG. 2, the display manager 132 may determine the period of time 214 to accumulate the updates 212 in the screen update buffer 122. In some cases, instead of determining a period of time, the display manager may determine a number of updates to accumulate.

At 508, the period of time may be modified based on one or more properties of the first window, one or more properties of the second window, or both. In some cases, the number of updates to accumulate may be modified based on one or more properties of the first window, one or more properties of the second window, or both For example, in FIG. 4, the display manager 132 may modify the period of time or the number of updates to accumulate based on the properties 146, the properties 308, the properties 404, or any combination thereof.

At 510, the updates may be accumulated. For example, in FIG. 4, the updates 212 may be accumulated over a period of time or until a predetermined number of updates have been accumulated.

At 512, at least one of the updates may be sent to a portion of the display device. For example, in FIG. 4, in some implementations, the display manager 132 may delay sending some of the updates 212 to the display device 108 but may continue to send other updates of the updates 212 to a portion of the display device 108.

At 514, a single update that includes the accumulated updates may be sent to the display device. For example, in FIG. 4, the display manager 132 may send a single update that includes the accumulated updates 212 to the display device 108 after the period of time has elapsed. In some cases, the display manager 132 may send a single update that is equivalent to the accumulated updates 212 to the display device 108 after the period of time has elapsed. For example, a first update of the accumulated updates may cause a first pixel to change to a first value and a second update of the accumulated updates may cause the first pixel to change from the first value to a second value. An equivalent update may change the first pixel to the second value without changing it to the first value. Thus, an equivalent update may change the values of the pixels of the display device 108 to the values that the pixels would have had if each of the accumulated updates been applied individually.

At 516, a flash update of the display device may be performed based on the accumulated updates, a temperature associated with the display device, properties of the first window, properties of the second window, or any combination thereof. For example, in FIG. 4, after sending the updates 212 to the display device 108, the display manager 132 may perform a flash update of the display device 108 based on the updates 212, the properties 146, the properties 308, the properties 404, a characteristic (e.g., temperature) associated with the display device 108, or any combination thereof. To illustrate, when at least one of the updates 212 includes an instruction to perform a flash update, the display manager 132 may cause a flash update of the display device 108 to be performed.

Figure 6:
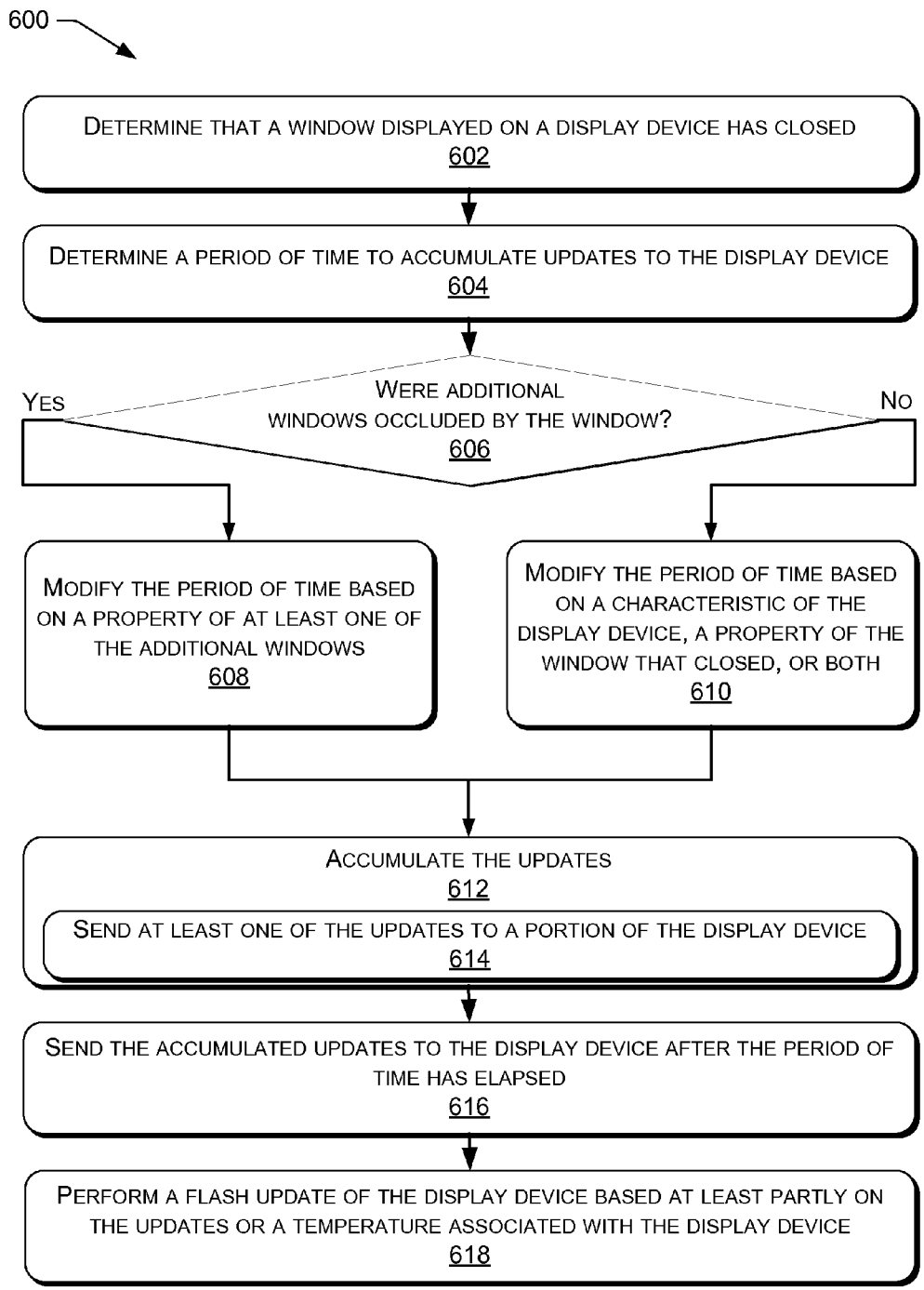
FIG. 6 is a flow diagram of an example process that includes determining a period of time to accumulate updates to a display device when a window has closed, according to some implementations.

FIG. 6 is a flow diagram of an example process 600 that includes determining a period of time to accumulate updates to a display device when a window has closed, according to some implementations. The process 600 may be performed by a software or firmware module of the display device 108 of FIG. 1, such as the display manager 132.

At 602, a determination may be made that a window (or other graphical user interface element) displayed on a display device has closed. For example, in FIG. 4, the display manager 132 may determine that at least one of the windows 304 or 402 has closed.

At 604, a period of time to accumulate updates to the display device is determined. In some cases, a number of updates to accumulate may be determined instead of or in addition to the period of time. For example, in FIG. 4, after determining that at least one of the windows 304 or 402 has closed, the display manager 132 may determine a period of time or a number of updates to accumulate.

At 606, a determination may be made as to whether additional windows were occluded by the window (e.g., the window that closed). For example, in FIG. 2, when the window 142 is closed, the display manager 132 may determine that no additional windows were occluded by the window 142. As another example, in FIG. 4, when the window 304 (or the window 402) closes, the display manager 132 may determine that the window 142 was occluded by the window 304 (or the window 402).

If a determination is made that additional windows were occluded by the window, at 606, the period of time (and/or the number of updates to accumulate) may be modified based on a property of at least one of the additional windows, and the process proceeds to 612. For example, in FIG. 4, in response to determining that the window 142 was occluded by the window 304, the display manager 132 may modify the period of time and/or the number of updates to accumulate based on the properties 146 of the window 142. In some cases, the display manager 132 may modify the period of time or the number of updates to accumulate based on the properties 146, the properties 308, the properties 404, or any combination thereof.

If a determination is made that no additional windows were occluded by the window, at 606, the period of time (and/or the number of updates to accumulate) may be modified based on a characteristic of the display device, a property of the window, or both, and the process proceeds to 612. For example, in FIG. 2, in response to determining that the window 142 did not occlude any additional windows displayed on the display device 108, the display manager 132 may modify the period of time and/or a number of updates to accumulate based on characteristics of the display device 108, the properties 146, or both. The characteristics of the display device 108 may include a desktop environment view, a background image, another view of the display device 108 that is displayed when no windows are open, and the like.

At 612, the updates may be accumulated. For example, in FIG. 4, the updates 212 may be accumulated over the period of time or until a predetermined number of updates have been accumulated.

At 614, at least one of the updates may be sent to a portion of the display device. For example, in FIG. 4, the display manager 132 may delay sending some of the updates 212 to the display device 108 but may continue to send other updates of the updates 212 to a portion of the display device 108.

At 616, a single update that includes the accumulated updates may be sent to the display device after the period of time has elapsed. For example, in FIG. 4, the display manager 132 may send a single update that includes the accumulated updates 212 to the display device 108 after the period of time has elapsed or after the predetermined number of updates have been accumulated. In some cases, the display manager 132 may send a single update that is equivalent to the accumulated updates 212 to the display device 108 after the period of time has elapsed. For example, the equivalent update may change the values of the pixels of the display device 108 to the values that the pixels would have had if each of the accumulated updates been sent individually to the display device 108.

At 618, a flash update of the display device may be performed based on the accumulated updates, a temperature associated with the display device, properties of the first window, properties of the second window, or any combination thereof. For example, in FIG. 4, after sending the updates 212 to the display device 108, the display manager 132 may perform a flash update of the display device 108 based on the updates 212, the properties 146, the properties 308, the properties 404, a characteristic (e.g., temperature) associated with the display device 108, or any combination thereof. To illustrate, when at least one of the updates 212 includes an instruction to perform a flash update, the display manager 132 may cause a flash update of the display device 108 to be performed.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An electronic book (eBook) reader device comprising:
   one or more display devices;
   a display controller;
   one or more processors; and
   one or more computer-readable media comprising instructions executable by the one or more processors to perform acts comprising:
      receiving a first notification indicating that a user interface window is to be opened on at least one display device of the one or more display devices;
      determining a first property associated with the user interface window;
      accumulating a first set of updates to the at least one display device until a first number of updates of the first set of updates has been accumulated, the first number of updates of the first set of updates being determined based at least partly from the first property;
      sending the first set of updates to the at least one display device;
      receiving a second notification indicating that the user interface window is to be closed;
      determining that an additional window was occluded by the user interface window;
      determining a second property associated with the additional window;
      accumulating a second set of updates until a second number of updates of the second set of updates has been accumulated, the second number of updates being determined based at least partly from the second property; and
      sending the second set of updates to the at least one display device.

2. The eBook reader device of claim 1, wherein the first property includes at least one of:
   a sensitivity setting associated with the user interface window;
   a size of the user interface window;
   a type of content displayed in the user interface window;
   a shape of the user interface window; or
   a draw mode associated with the user interface window.

3. The eBook reader device of claim 1, further comprising:
   determining whether to perform a flash update based at least partly on at least one of:
   the first number of updates of the first set of updates,
   the second number of updates of the second set of updates,
   a temperature of the at least one display device,
   an ambient temperature, or
   the first property associated with the user interface window.

4. The eBook reader device of claim 1, wherein the acts further comprise:
   determining a characteristic associated with the at least one display device;
   accumulating a third set of updates to the at least one display device until a third number of updates of the third set of updates have been accumulated, the third number of updates being determined from the characteristic; and
   sending, to the at least one display device, the the third set of updates.

5. A method performed by one or more processors executing instructions stored in a non-transitory computer-readable storage medium, the method comprising:
   determining that a first window displayed on a display device has opened;
   delaying sending a first set of updates to a portion of the display device for a first period of time determined based at least partly on a first property associated with the first window;
   sending the first set of updates to the display device after the first period of time has elapsed;
   determining that the first window has closed;

determining that no additional windows were occluded by the first window;
delaying sending a second set of updates for a second period of time;
sending the second set of updates to the display device after the second period of time has elapsed;
delaying sending a third set of updates for a third period of time, the third period of time determined based at least partly on a display characteristic of the display device; and
sending the third set of updates to the display device after the third period of time has elapsed.

6. The method of claim 5, further comprising:
performing a flash update of the display device based at least partly on at least one of:
the first set of updates,
the second set of updates,
the first period of time,
the second period of time,
a temperature associated with the display device, or
the first property associated with the first window.

7. The method of claim 5, further comprising:
determining whether a second window is associated with the first window; and
modifying the first period of time based at least partly on a second property associated with the second window.

8. The method of claim 5, wherein the first property includes at least one of:
a sensitivity setting associated with the first window;
a size of the first window;
a type of content displayed in the first window; or
a shape of the first window.

9. The method of claim 5, further comprising:
determining that a second window has closed;
determining that one or more additional windows were occluded by the second window;
determining an additional property associated with a topmost window of the one or more additional windows; and
delaying sending a fourth set of updates for a fourth period of time, the fourth period of time being determined at least partly from the additional property; and
after the fourth period of time has elapsed, sending to the display device the fourth set of updates.

10. The method of claim 5, further comprising:
while delaying sending the first set of updates to the portion of the display device for the first period of time, updating a remaining portion of the display device.

11. The method of claim 10, wherein the remaining portion is used to display one or more icons or a third window.

12. The method of claim 10, wherein the remaining portion is used to display at least one of a spinner icon, a signal strength icon, or a battery strength icon.

13. A computing device comprising:
a display device;
a display controller to perform updates to the display device;
one or more processors; and
one or more computer-readable media comprising instructions executable by the one or more processors to perform acts comprising:
receiving a first notification indicating that a window has opened;
accumulating a first set of updates to the display device for a first period of time, the first period of time selected based at least partly on a first property associated with the window;
sending the accumulated first set of updates to the display device after the first period of time has elapsed;
receiving a second notification indicating that the window has closed;
determining that one or more additional windows were occluded by the window;
determining a second property associated with a topmost window of the one or more additional windows;
accumulating a second set of updates until a second period of time has elapsed, the second period of time based at least partly on the second property; and
sending the second set of updates to the display device.

14. The computing device of claim 13, wherein the first property includes at least one of:
a sensitivity setting associated with the window;
a size of the window;
a type of content displayed in the window; or
a shape of the window.

15. The computing device of claim 13, the acts further comprising:
in response to receiving the second notification indicating that the window has closed, determining whether portions of the one or more additional windows were at least partially occluded by the window before the window closed.

16. The computing device of claim 15, further comprising:
accumulating a third set of updates associated with the at least partially occluded portions of the one or more additional windows.

17. The computing device of claim 13, the acts further comprising:
performing a flash update of the display device after sending the first set of updates to the display device.

18. One or more non-transitory computer-readable storage media comprising instructions executable by one or more processors to perform acts comprising:
determining that a first window has opened;
delaying sending a first set of updates to a display device for a first period of time determined based at least partly on a first property associated with the first window;
sending the first set of updates to the display device after the first period of time has elapsed;
determining that one or more additional windows were occluded by the first window;
determining a second property associated with a topmost window of the one or more additional windows; and
sending a second set of updates to the display device after a second period of time has elapsed, the second period of time determined based at least partly on the second property.

19. The one or more non-transitory computer-readable storage media of claim 18, the acts further comprising:
performing a flash update of the display device based at least partly on the first property associated with the first window.

20. The one or more non-transitory computer-readable storage media of claim 18, the acts further comprising:
performing a flash update of the display device based at least partly on the first set of updates.

21. The one or more non-transitory computer-readable storage media of claim 18, the acts further comprising:
performing a flash update of the display device based at least partly on a temperature associated with the display device.

22. The one or more non-transitory computer-readable storage media of claim 18, wherein the acts further comprise:

determining that no additional windows were occluded by the first window; and sending a third set of updates to the display device after a third period of time has elapsed, the third period of time selected based at least partly on a characteristic of the display device.

23. The one or more non-transitory computer-readable storage media of claim 18, the acts further comprising:

performing a flash update of the display device based at least partially on one or more of:
 the first property associated with the first window,
 the second property associated with the topmost window,
 the first set of updates,
 the second set of updates, or
 a temperature associated with the display device.

* * * * *